(12) United States Patent
Hsu

(10) Patent No.: US 8,454,243 B2
(45) Date of Patent: Jun. 4, 2013

(54) OPTICAL FIBER COUPLING CONNECTOR

(75) Inventor: Chia-Ling Hsu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 296 days.

(21) Appl. No.: 12/943,944

(22) Filed: Nov. 11, 2010

(65) Prior Publication Data
US 2012/0045176 A1    Feb. 23, 2012

(30) Foreign Application Priority Data

Aug. 18, 2010 (TW) ................ 99127506 A

(51) Int. Cl.
G02B 6/38 (2006.01)
(52) U.S. Cl.
USPC .......................................................... 385/74
(58) Field of Classification Search
USPC .......................................................... 385/74
See application file for complete search history.

(56) References Cited

U.S. PATENT DOCUMENTS

| 4,420,219 | A  | * | 12/1983 | Muchel .......................... 385/74 |
| 4,421,383 | A  | * | 12/1983 | Carlsen .......................... 385/79 |
| 4,718,744 | A  | * | 1/1988  | Manning ........................ 385/79 |
| 4,781,431 | A  | * | 11/1988 | Wesson et al. ................. 385/79 |
| 4,925,267 | A  | * | 5/1990  | Plummer et al. ............... 385/74 |
| 5,247,595 | A  | * | 9/1993  | Foldi ............................. 385/78 |
| 5,450,514 | A  | * | 9/1995  | Hotea et al. .................... 385/87 |
| 5,495,545 | A  | * | 2/1996  | Cina et al. ..................... 385/92 |
| 6,655,850 | B2 | * | 12/2003 | Mann et al. .................... 385/74 |
| 7,766,557 | B2 | * | 8/2010  | Durrant ......................... 385/88 |
| 7,775,725 | B2 | * | 8/2010  | Grinderslev .................. 385/74 |
| 2003/0095760 | A1 | * | 5/2003 | Lee et al. ....................... 385/93 |

* cited by examiner

*Primary Examiner* — Daniel Petkovsek
(74) *Attorney, Agent, or Firm* — Altis Law Group, Inc.

(57) ABSTRACT

A fiber coupling connector includes a receptacle and a plug for insertion into the receptacle. The plug includes a first lens portion and a first sleeve receiving and surrounding the first lens portion. The receptacle includes a second lens portion and a second sleeve receiving and surrounding the second lens portion. The second sleeve is engagingly received in the first sleeve such that the first lens portion is optically coupled with the second lens portion.

5 Claims, 4 Drawing Sheets

OPTICAL FIBER COUPLING CONNECTOR

BACKGROUND

1. Technical Field

The present disclosure relates to an optical fiber coupling connector.

2. Description of Related Art

Optical fiber coupling connector has been widely used as an interface for high-speed transmission of electronic data between a computer host and a computer peripheral apparatus, such as a scanner, a digital camera, a mobile phone, a music player, etc. The optical fiber coupling connector usually includes a receptacle and a plug coupled with the receptacle. The receptacle includes at least two first lenses and two positioning recesses respectively formed beside the distal two first lenses. The plug includes at least two second lenses and two bars respectively formed beside the distal two second lenses. When in use, the plug couples with the receptacle in a manner that each of the bars is received in a corresponding restricting recess. Hence, the at least two first lenses each couple with a corresponding second lens, and electronic data is transmitted.

However, the first lenses and second lenses are always directly exposed to the exterior without any covering, and, with handling, are prone to scratching and fouling, the result of which is increased transmission loss. Therefore, it is necessary to provide an optical fiber coupling connector exhibiting low transmission loss.

BRIEF DESCRIPTION OF THE DRAWINGS

Many aspects of the present optical fiber coupling connector can be better understood with reference to the following drawings. The components in the drawings are not necessarily drawn to scale, the emphasis instead being placed upon clearly illustrating the principles of the present optical fiber coupling connector. Moreover, in the drawings, like reference numerals designate corresponding parts throughout the several views.

DETAILED DESCRIPTION

Embodiments of the present optical fiber coupling connector will now be described in detail and with reference to the drawings.

Figure 1:
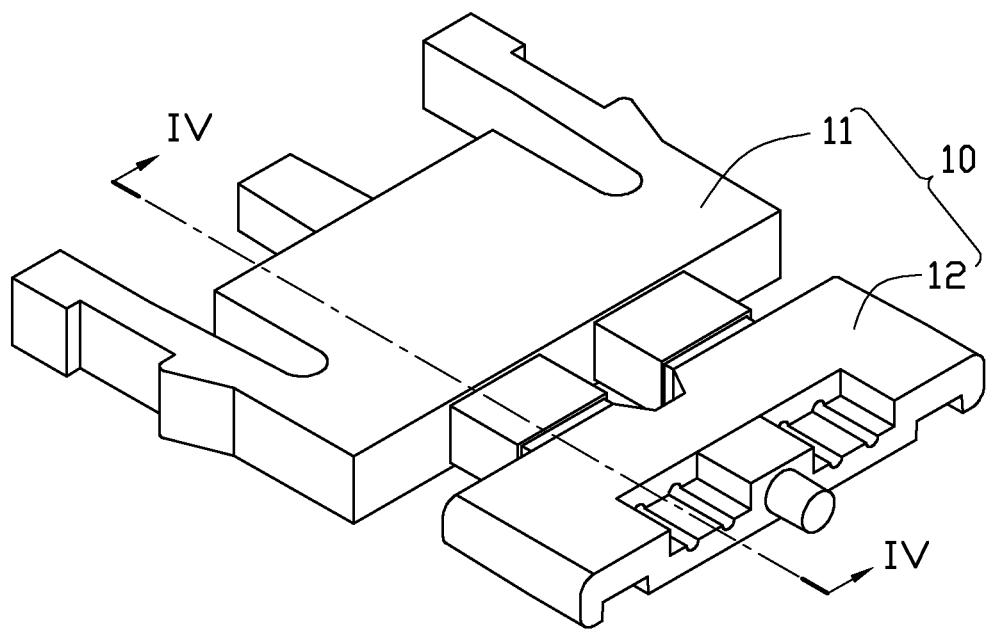
FIG. 1 is an isometric, perspective view of an optical fiber coupling connector in accordance with an exemplary embodiment.
Figure 2:
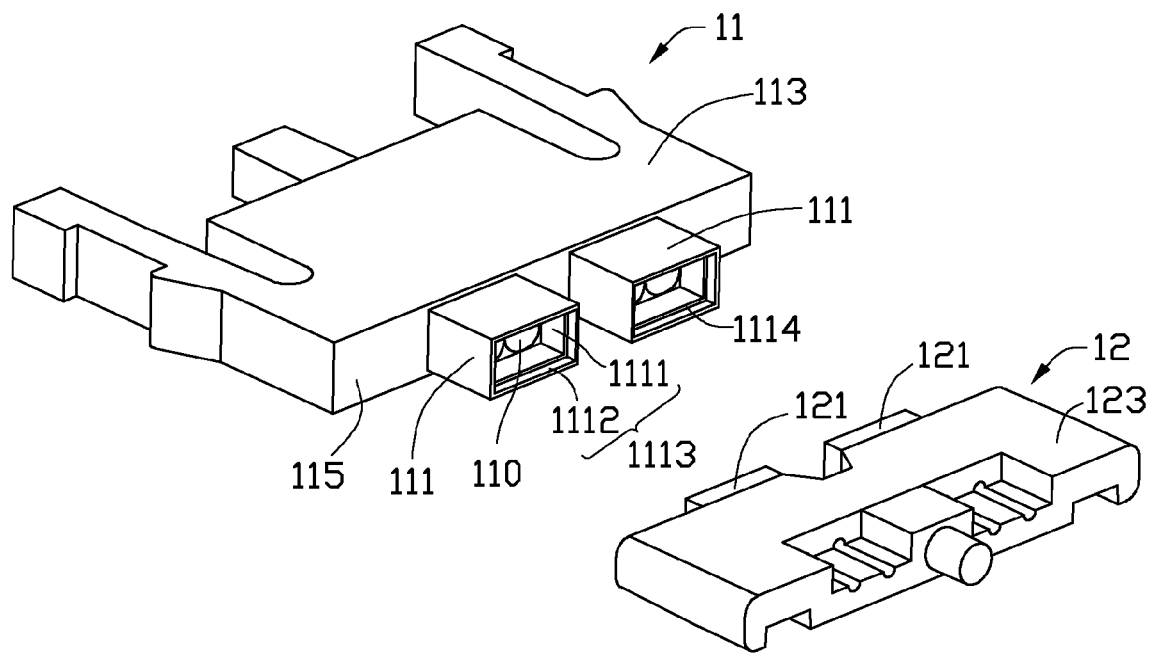
FIG. 2 is an exploded view of the optical fiber coupling connector of FIG. 1.
Figure 3:
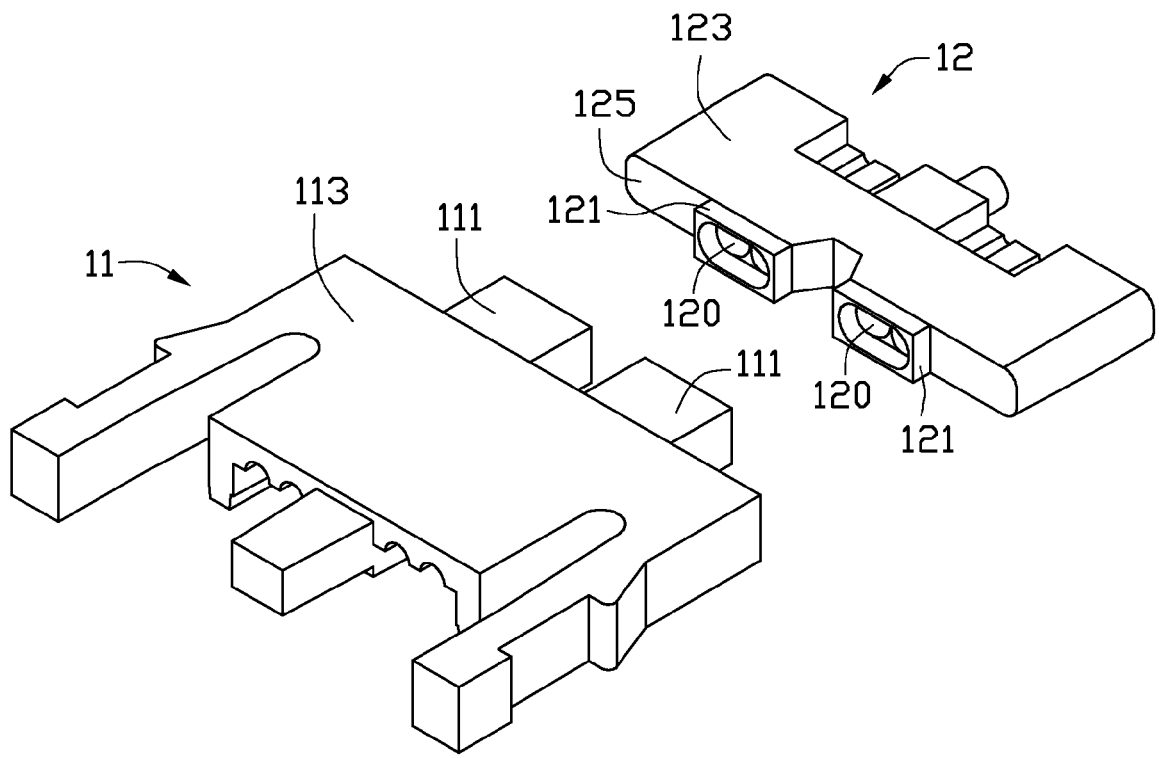
FIG. 3 is another exploded view of the optical coupling connector of FIG. 1.
Figure 4:
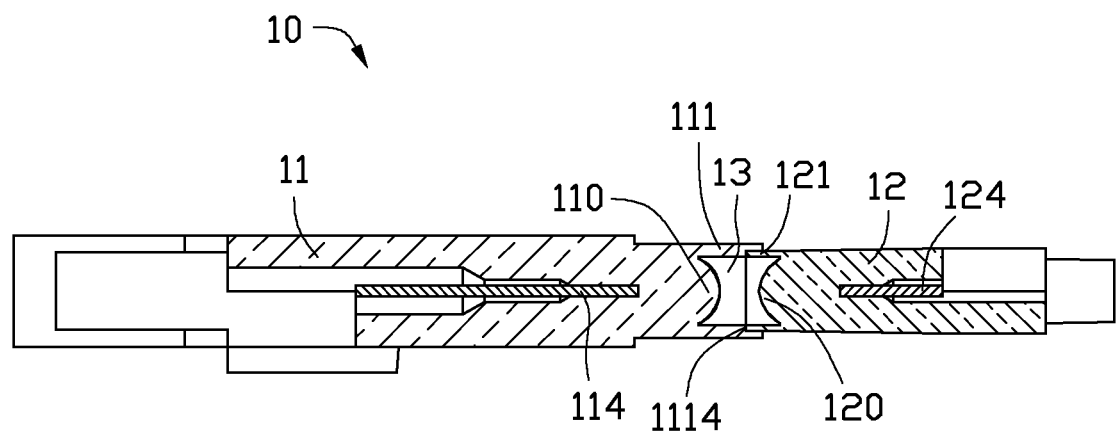
FIG. 4 is a cross-sectional view of the optical coupling connector of FIG. 1, taken along line IV-IV.

Referring to FIGS. 1 to 4, an optical fiber coupling connector 10 according to an exemplary embodiment of the present disclosure includes a receptacle 12 and a plug 11 received in the receptacle 12. The plug 11 is generally assembled in a host computer, and the receptacle 12 is portable and configured for receiving the plug 11 such that data is transmitted between the host computer and the computer peripheral apparatus.

In detail, the plug 11 encompasses a first sheath 113, four first lens portion 110, four first optical fibers 114, and two first sleeves 111. The first sheath 113 includes a first coupling surface 115. The four first lenses portion 110 protrude from the sheath 113 at the first coupling surface 115. The sheath 113 and the first lenses portion 110 are transparent plastic in an unitary piece formed by standard injection molding. The four first optical fibers 114 are accommodated in the first sheath 113 and separated. Each of the first optical fibers 114 is coaxial with a corresponding first lens portion 110 with one end thereof adjacent to the convex side and focused with the first lens portion 110. Each of first optical fibers 114 has a similar structure with a typical optical fiber, including an inner core for transmitting signals, an outer insulated layer, and an intermediate glass fiber.

The two first sleeves 111 extend from the first coupling surface 115 and respectively receive and surround two first lenses 110. In actual manufacture, the first sleeves 111 can be formed with the first sheath 113 and the first lens portion 110 in an unitary piece. The first sleeves 111 can be also manufactured individually, and mounted on the first coupling surface 115 by adhesive. Each of first sleeves 111 defines a stepped through hole 1113 therein. The stepped through hole 1113 consists of a first through hole 1112 and a second through hole 1111 coaxially communicated with the first through hole 1112. The first through hole 1112 is wider than the second through hole 1111, such that an engaging surface 1114 is defined and exposed to the exterior from the stepped through hole 1113, and the first lenses 110 are exposed via the first through hole 1112.

The receptacle 12 has a substantially similar configuration to the plug 11. In detail, the receptacle 12 includes a second sheath 123, four second lens portion 120, four second optical fibers 124, and two second sleeves 121. The second sheath 123 includes a second coupling surface 125. The four second lenses 120 protrude from the second sheath 123 at the second coupling surface 125. The second sheath 123 and the second lens portion 120 are of transparent plastic in an unitary piece formed by standard injection molding. The four second optical fibers 124 are accommodated in the second sheath 123 without contacting each other. Each of the second optical fibers 124 is coaxial and separated from a corresponding second lens portion 120 and focused with the second lens portion 120.

The two second sleeves 121 extend from the second coupling surface 125 and respectively surround two second lens portion 120. In actual manufacture, the second sleeves 121 can be formed with the second sheath 123 and the second lens portion 120 in an unitary piece. The two second sleeves 121 can be also manufactured individually, and mounted on the second coupling surface 125 by adhesive. An outer diameter of the second sleeve 121 equals a diameter of the first through hole 1112, and exceeds a diameter of the second through hole 1111. In other words, each of the second sleeves 121 is fittingly received in the first through hole 1112 with an end surface thereof contacting the engaging surface 1114. As such, the first and second sleeves 111, 121 cooperatively form a chamber enclosing the first and second lens portion 110, 120 therein.

When in use, the second sleeves 121 receives the first sleeves 111, and the first optical fiber 114 is optically coupled with the second optical fiber 124 through the first lens portion 110 and the second lens portion 120. In this manner, optical signals can be transmitted between a host computer and a computer peripheral apparatus. In detail, the first optical fiber 114 transmits the signals from the host computer to the first lens portion 110, the first lens portion 110 spreads the signals, the second lens portion 120 straightens the signals, and the second optical fiber 124 receives the signals and transmits them into the computer peripheral apparatus. It is understood that signals are simultaneously transmitted from the computer peripheral apparatus to the host computer.

In the present embodiment, the first lens portion 110 and the second lens portion 120 are protected with the first sleeves 111 and the second sleeves 121, respectively, thereby avoiding damage and fouling. In addition, the engaging surface 1114 positions the second sleeves 121 when the plug 11 is received in the receptacle 12. Therefore, the first lens portion 110 and the second lens portion 120 can optically couple more precisely.

In other embodiments, each first lens portion 110 and each second lens portion 120 are respectively surrounded by a first sleeve 111 and a second sleeve 121. Both the plug 11 and the receptacle 12 include more than four optical fibers and lenses. The first sleeve 111 has a uniform width along its longitudinal axis, and a protrusion is formed therein for restricting the end of the second sleeve 121.

The described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A fiber coupling connector comprising a receptacle and a plug for insertion into the receptacle, the plug comprising a first lens portion and a first sleeve receiving and surrounding the first lens portion, the receptacle comprising a second lens portion and a second sleeve receiving and surrounding the second lens portion, the second sleeve being engagingly received in the first sleeve such that the first lens portion is optically coupled with the second lens portion;

wherein the plug comprises a first sheath, the receptacle comprises a second sheath, the first lens portion and the first sheath are integrally formed by injection molding transparent plastic into a first unitary piece, and the second lens and the second sheath are integrally formed by injection molding transparent plastic into a second unitary piece.

2. The fiber coupling connector of claim 1, wherein the first sleeve comprises a stepped through hole and an engaging surface in the stepped through hole, and the second sleeve includes an end surface for engaging with the engaging surface.

3. The fiber coupling connector of claim 1, wherein the first lens portion, the first sheath and the first sleeve are integrally formed by injection molding transparent plastic into the first unitary piece, and the second lens portion, the second sheath and the second sleeve are integrally formed by injection molding transparent plastic into the second unitary piece.

4. The fiber coupling connector of claim 1, wherein the first sleeve and the second sleeve are respectively mounted on the first sheath and the second sheath.

5. A fiber coupling connector comprising
   a plug comprising:
      a first housing,
      a first lens portion formed on the housing,
      an optical fiber received in the first housing and optically coupled with the first lens portion, and
      a first sleeve surrounding the first lens portion, and
   a receptacle for receivingly engaging with the plug, the receptacle comprising:
      a second housing,
      a second lens portion formed on the second housing,
      an optical fiber received in the second housing and optically coupled with the second lens portion, and
      a second sleeve surrounding the second lens portion;
      the second sleeve being insertable into the first sleeve such that the first and second sleeves cooperatively form a chamber enclosing the first and second lens portion therein;
   wherein the first lens portion is integrally formed with the first housing by injection molding transparent plastic into a first unitary piece, and the second lens portion and the second housing are integrally formed by injection molding transparent plastic to form a second unitary piece.

* * * * *